Dec. 22, 1942.　　　M. SEIDEL　　　2,305,796
DEVICE FOR DISTRIBUTING AIR AND GASES IN LIQUIDS
Filed Nov. 4, 1938
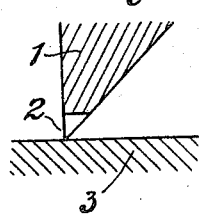
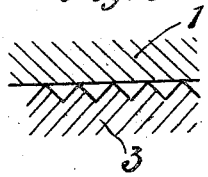
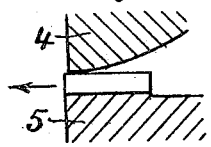
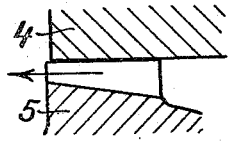
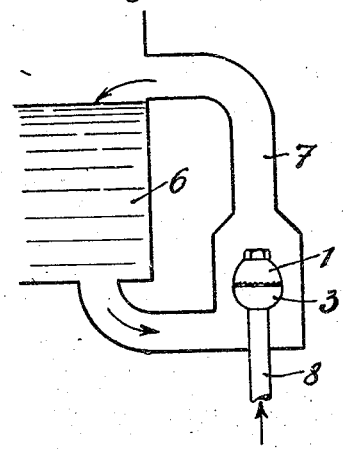
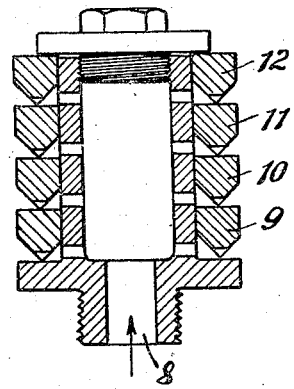
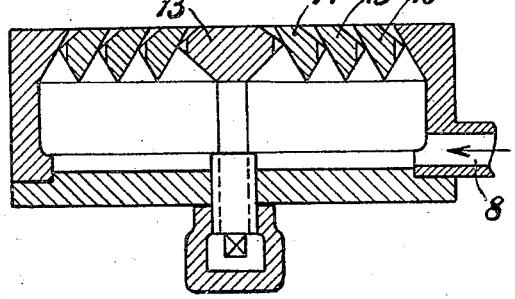
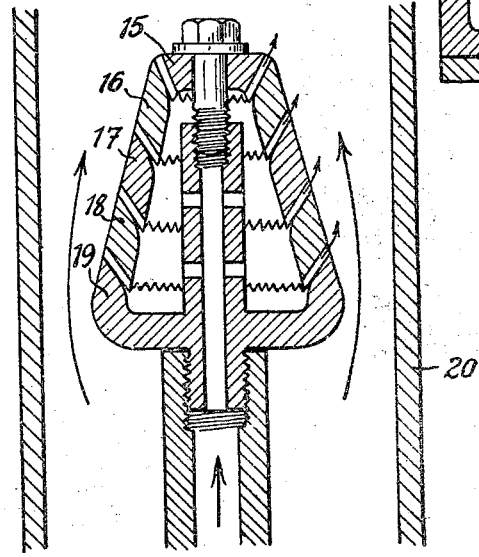
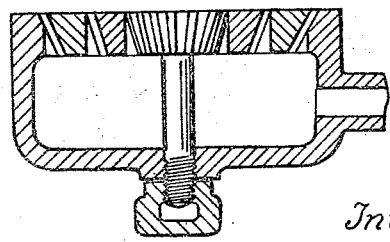
Inventor:
Max Seidel
Attorney.

Patented Dec. 22, 1942

2,305,796

UNITED STATES PATENT OFFICE 2,305,796

DEVICE FOR DISTRIBUTING AIR AND GASES IN LIQUIDS

Max Seidel, Solln, near Munich, Germany; vested in the Alien Property Custodian

Application November 4, 1938, Serial No. 238,909
In Germany November 16, 1937

1 Claim. (Cl. 261—122)

This invention relates to an aerating device consisting of two or more parts for distributing air and other gases in liquids. The device is intended in particular for use in aerating fermentation vessels.

The distribution of air or other gases in liquids, in particular for the aeration of fermentation vessels, for example in the propagation of micro-organisms, has hitherto usually been effected in practice with the aid of perforated metal plates or pipes. In addition to this, aerating systems with porous stones, porous porcelain and similar bodies are also frequently employed.

The distribution devices consisting of perforated metal are quite suitable for use if the holes provided in them are relatively large. If, however, a very fine distribution of gas in the liquid is desired, very fine holes must be used. Such fine holes easily get blocked up by micro-organisms or by salts and substances which sink downwards on to them. The same remarks apply to porous ceramic aerating bodies which easily become blocked owing to the greater or less lack of uniformity in their permeability and owing to the presence of many pores which are open on the outside but closed on the inside and many pores which are incompletely permeable, the result of which is that micro-organisms or deposited material and the like can penetrate deeply into the pores. The parts of less permeability attract the liquid by which they are wetted, so that the passage through the bodies always becomes more irregular. Micro-organisms and other substances easily penetrate into the pores which are blocked to the passage of gas and further blocking and centres of infection are produced by growing micro-organisms, colonies of crystals and the like. When the bodies are cleaned and disinfected residues from the dead micro-organisms or other impurities almost always remain suspended in the pores, so that the renewed occurrence of blocking and infection is favoured.

The difficulties connected with the existing aerating devices for distributing gases in a state of fine sub-division in liquids are therefore primarily due to the difficulty of cleaning them and to the insufficient uniformity of the pores in the case of ceramic bodies and to the difficulty of making straight and even holes of sufficient fineness.

According to the present invention, these difficulties are obviated by making the aerating device in two or more parts one of which has a sharp toothed edge which is formed, for example, by milling or the like, and is pressed against a plane surface on another part, the toothed edge being suitably of circular shape. Therefore instead of line contact between the two parts there is point contact. The bodies employed, of which the parts in contact form between them the space through which the air passes can be easily taken apart and can be cleaned simply by brushing them, boiling them or washing them. A similar result is obtained, in accordance also with the invention, by providing one part of the body with a toothed surface, which is formed for example by milling, grinding, stamping or other suitable method, and is pressed against another part which is not provided with teeth, for example against a sharp edge or against a plane surface. In this case also there is only point or line contact between the two parts instead of surface contact as in the known apparatus, and the air distribution openings, which can be made with the simplest means and of any desired degree of fineness, can also be cleaned easily. This inventive idea does not resemble in any way the known coarse distribution devices in which air distribution openings are arranged between two parts of a body. In the known apparatus the cross-section of the openings is uniform or increases in the direction of flow of the gas or vapour to be distributed over a considerable length of the gas passage. Further, in the known apparatus the openings are not formed by the parts of the body alone, but interposed plates are employed in addition. As distinguished therefrom, in the apparatus according to the invention distribution apertures of any desired fineness can be produced by suitable selection of the form of the edges with the simplest mechanical means.

The individual parts of the air distributing apparatus can also be constructed and pressed together in such a manner that a series of passages which taper towards the gas outlet end is formed between the parts; for example, the part which is pressed against the toothed surface may bear against the latter only at the outlet end and form with the toothed surface a gap which tapers towards the outlet side, or the teeth on the surface of the one part may be deeper or the cross-section of the gap between the teeth may be greater at the inlet side than on the outlet side.

In all cases the toothed surface may be circular as in the known apparatus. Further, the aerating device may advantageously be constructed of several preferably annular parts which are arranged either one above another or concentrically one inside another, and are provided on the one side with a toothed surface and on the other side with a plane edge or surface against which the toothed surface of the adjacent part bears or alternate parts may be provided with toothed surfaces on both sides and with plane edges or surfaces on both sides.

The method of manufacturing the aerating devices in accordance with the invention enables many different kinds of material to be employed, such as metals, hard rubber, artificial resins and so forth, and the aerating device may also be constructed of a number of parts some of which are made of different material from others. In selecting the material regard can be paid to the purpose for which the device is to be employed, for example, to the corrosive properties of the liquid to be fermented. Different metals can be separated by non-metals in order to avoid corrosion by electric currents. The production of a number of very fine openings by milling an edge enables the air or gas to be distributed in a state of sub-division which is little inferior in fineness to that which can be obtained by means of diaphragms but is superior as regards the uniformity of distribution. It is possible directly to produce openings having a cross-section of about one hundredth of a square millimetre or less in the simplest manner. Owing to the uniform shape and size of all the openings which are formed in this way gas bubbles of uniform size are produced and these rise in the liquid with approximately the same speed, so that secondary currents at right-angles to the vertical upward movement of the gas bubbles which lead to the rapid coalescing of a series of gas bubbles are not formed so easily. Such secondary currents can be observed when aeration is effected by means of finely divided air with the use of diaphragms in consequence of the lack of uniformity in the permeability of the diaphragms and the irregular size of the gas bubbles which enter the liquid.

When the apertures for the passage of the gas and air which are formed by the toothed edges are very small, then, although the number of apertures may be very large, the resistance to the passage of the gas can be kept so high that, even in the case of long distributing pipes or other distributing bodies, the pressure drop in the distribution pipes has practically no effect on the uniform distribution and on the size of the individual gas bubbles which enter the fermentation liquid.

The new aerating device may advantageously be fitted outside or inside the vessel containing the liquid to be aerated and arranged to operate in a similar manner to the rising pipe of a Mammoth pump, since the uniform size of the gas bubbles is particularly favourable to the Mammoth pumping effect, and since the new aerating device enables a fine distribution and air to be obtained with a distributing device of small dimensions. This powerful inter-mixture of gas bubbles and liquid in the rising pipe of the Mammoth pump makes the aeration still more efficacious, so that the effect obtained is equivalent to that of very fine ceramic aerating devices.

When aeration is done by means of a rising pipe having a Mammoth pump effect, in spite of the small cross-section which is aerated, a very effective aeration of the total contents of the vessel is obtained since, owing to the Mammoth pump effect, the liquid passes very quickly through the rising pipe and since the liquid at the bottom of the vessel which is usually free from gas is always drawn up by the pump which acts as a circulating pump The expulsion of other gases dissolved in the liquid, such as carbonic acid in the case of yeast culture, which inhibit the growth of the yeast, or other anaerobic micro-organisms takes place very quickly when aeration is effected in this way.

Various forms of the aerating device in accordance with the invention are illustrated diagrammatically and by way of example in the accompanying drawing. In addition to the examples illustrated in the drawing a number of other constructions are also possible.

In the drawing, Figures 1, 2, 3 and 4 show various forms of aerating devices which illustrate the fundamental principle of the invention.

Fig. 5 is a diagrammatical sectional view of an aerating apparatus using the structures of Figs. 1 and 2.

Figs. 6 to 9, inclusive, are cross-sectional views, respectively, of modified forms of aerating devices constructed according to this invention.

Referring to Figures 1 and 2 of the drawing, the part 1 is pressed with its edge 2 against the part 3. The edge 2 is continuously interrupted by milling or tooth-like indentations, so that the part 1 is in contact with the part 3 only at a number of points. The small openings for the passage of the gas into the liquid remain between these points.

In Figures 3 and 4 the part 4 is not toothed and the surface of the part 5 which is pressed against the part 4 is provided with teeth. This form of construction is particularly suitable for brittle materials such as artificial resins, ceramic materials and the like as well as for materials which are less hard such as, for example, copper, aluminium, hard rubber and so forth. The part 4 may either have a sharp edge which is pressed against the toothed surface, or in the case of more sensitive materials in particular, it may have a plane surface which is pressed against the toothed surface. It is advantageous to shape the body 4, as indicated in Figure 3, so that, when the gas flows in the direction indicated by the arrow, passages, which taper like nozzles towards the side at which the gas enters the liquid, are formed, the narrowest cross-section being the side at which the gas emerges as an effective means for preventing the penetration of liquids and impurities into the passages.

A similar effect is also obtained if, as shown diagrammatically in Figure 4, the teeth on the surface of the part 5 are made deeper at the side on which the gas enters than at the side on which it emerges.

Figure 5 represents an aerating device having an annular gap which is inserted in an aeration pipe 7 situated outside a vessel 6. The parts 1 and 3 are similar to the parts 1 and 3 shown in Figures 1 and 2. The gas to be distributed enters at 8.

Figure 6 shows an aerating device having a plurality of superimposed annular gaps which are formed between the rings 9, 10, 11 and 12.

Figure 7 shows an aerating device which is constructed of annular and circular elements 16, 15, 14, 13.

Figure 8 illustrates an aerating device which is assembled in conical form and is composed of parts 15, 16, 17, 18 and 19 respectively. When this device is inserted in the pipe 20 a Mammoth pumplike effect is obtained, since the liquid in the interior of the pipe 20 which is situated inside or outside the vessel containing the liquid to be aerated is caused to rise by the gas bubbles. Owing to the high velocity with which the rising liquid flows past the toothed aerating gap, the air bubbles are quickly torn off so that the action of the aerating system is equivalent to that of a system in which the air escapes from mechanically moved bodies, for example stirring blades, arranged inside the liquid.

Bodies of any other shape desired, for example cylindrical, plate shaped or other shape, can be constructed in a similar manner to the conical aerating body which has been illustrated. A further example of a body of this kind is illustrated in Figure 9. The filling bodies may be of any suitable form, for example they may be circular or of rod-like form. The circular form is best for most materials having regard to the method of manufacture which is usually adopted in practice. When the aerating devices are composed of several parts, one of the parts can be provided with teeth on both sides while another is without teeth.

Rectangular and other shapes can also be constructed in a similar manner, for instance from bar-like members.

I claim:

An aerating device for mixing gases with liquids in fermentation vessels comprising a first member having a toothed edge, the teeth of which have end edges in the form, at most, of fine lines, a second member having a smooth surface of arcuate section contacting the end edges of said teeth whereby each tooth edge engages said surface in a substantially point like contact, and means for conducting gas into said device for outflow between said teeth.

MAX SEIDEL.